No. 808,601. PATENTED DEC. 26, 1905.
O. C. DAVIS.
HOLDBACK FASTENING.
APPLICATION FILED FEB. 5, 1904.
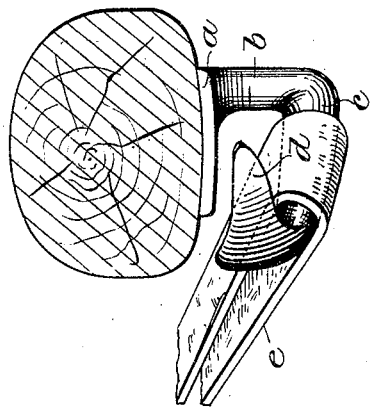
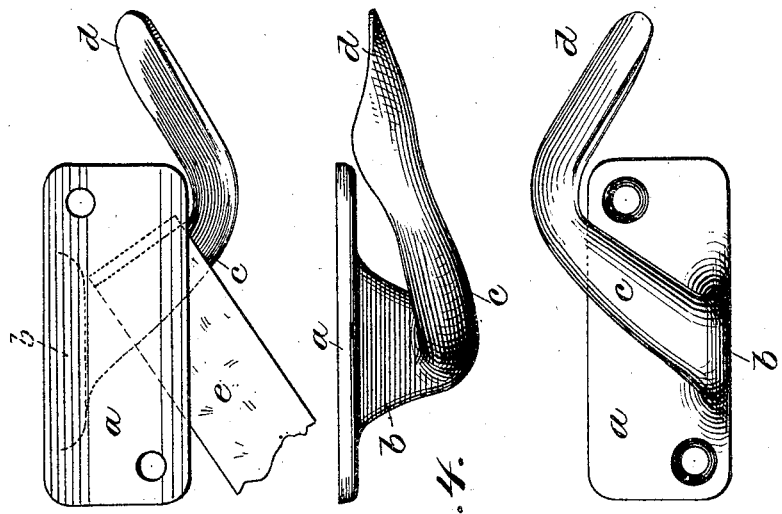
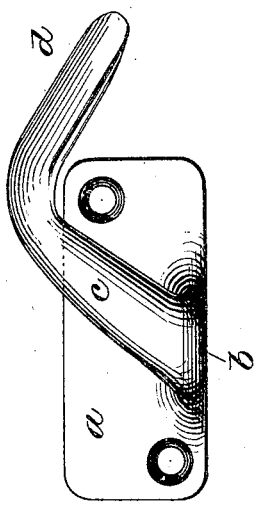
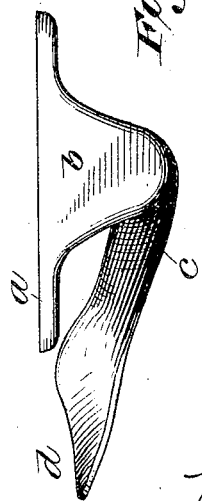
Witnesses:
Geo. W. Young.
Chas. L. Goss.
Inventor:
Orin C. Davis,
By Winkler Flanders Smith Bottum & Vilas
Attorneys.

UNITED STATES PATENT OFFICE.

ORIN C. DAVIS, OF MANISTEE, MICHIGAN.

HOLDBACK-FASTENING.

No. 808,601.   Specification of Letters Patent.   Patented Dec. 26, 1905.

Application filed February 5, 1904. Serial No. 192,099.

*To all whom it may concern:*

Be it known that I, ORIN C. DAVIS, a citizen of the United States, residing at Manistee, in the county of Manistee and State of Michigan, have invented certain new and useful Improvements in Holdback-Fastenings, of which the following is a specification, reference being had to the accompanying drawings, forming a part thereof.

The main objects of this invention are to facilitate hitching and unhitching a horse to and from a vehicle having shafts by avoiding the necessity of buckling and unbuckling the holdback-straps, to permit the detachment of the holdback-straps from the shafts, and to free the horse from the vehicle in case of accidental detachment or breaking of the traces or whiffletree, thereby avoiding injury and damage to the vehicle and its occupants, and generally to simplify and improve the construction and operation of fastenings for this purpose.

It consists in certain novel features of construction hereinafter particularly described, and pointed out in the claims.

In the accompanying drawings like letters designate the same parts in the several figures.

Figure 1 is a plan view of my improved fastening. Fig. 2 is a front elevation of the same, with a cross-section of a vehicle-shaft to which it is attached. Fig. 3 is a side elevation as viewed from the top of Fig. 1. Fig. 4 is a side elevation as viewed from the bottom of Fig. 1, and Fig. 5 is an inverted plan view of the fastening.

The fastening comprises a base or attachment plate *a*, a depending post *b* on the outer side of said plate approximately perpendicular thereto, an arm *c*, extending from the free end of said post inwardly and forwardly in an oblique direction across and toward said plate, and a flattened or fin-like reversely-bent extension *d* at the free end of said arm. The plate *a* is fitted to the under side of the shaft and attached thereto by screws passing through countersunk holes in the plate. The post *b* is preferably flattened, as shown, and extended in a longitudinal direction as it approaches the plate to give it the requisite strength. The oblique arm *c* is preferably made approximately circular in cross-section and extends at its free end somewhat beyond the inner edge of the plate *a* near its front end. The flattened or fin-like extension *d*, which is bent obliquely outward at an obtuse angle to the arm *c*, is tapered toward its free end and twisted from an approximately perpendicular plane, where it joins the arm *c* to an approximately horizontal plane at its free end. It extends obliquely outward underneath the shaft a short distance therefrom, and its formation is such that a looped holdback-strap *e* can be readily caught upon it and carried into working position on the oblique arm *c*, as shown in Figs. 1 and 2. The arm *c* is formed at such an angle to the plate that the holdback-strap *e*, as shown in Fig. 1, will have a bearing thereon its entire width, and the pull exerted through said strap will be in a direction approximately at right angles to said arm. The forward, inward, and upward bend of the arm *c* and the forward and outward bend of the extension *d* permit the holdback-strap to be easily withdrawn from the fastening, thereby freeing the horse from the vehicle when the traces are accidentally or otherwise detached. This formation of said arm and its terminal extension at an oblique angle thereto also admit of easily placing the strap on the fastening and at the same time with the upward bend of the extension, which closely approaches the plane of the base-plate *a* and forms a shoulder next to the arm, as shown in Figs. 2, 3, and 4, prevent the strap, particularly when it is slack, from slipping off and becoming accidentally disengaged from the fastening as long as the horse is attached by the traces to the vehicle.

A fastening constructed as herein shown and described is simple, strong, durable, and of light and neat appearance. It avoids the use of springs and pivoted or loose parts, which are liable to break, rattle, and occasion trouble, and it can be easily and quickly applied to the shafts of a vehicle.

For the purpose of illustration a single fastening is shown; but it will be understood that the fastenings are to be made in pairs, with the arms reversed or right and left. The fastening shown in the drawings is designed for the left shaft.

Slight changes in details of construction may be made without materially affecting the operation of the fastening and within the scope of my invention.

I claim—

1. A holdback-fastening consisting of a plate formed with a post approximately perpendicular thereto and an arm extending from the free end of said post obliquely inward and terminating in a fin-shaped extension which projects obliquely outward and forward from the inner end of said arm and forms therewith a shoulder closely approaching the plane of said plate, substantially as described 2. A holdback-fastening consisting of a plate formed at one side with a depending flattened and longitudinally-extended post approximately perpendicular thereto, and an arm extending forwardly and obliquely across said plate toward its inner edge and terminating in a flattened, reversely-bent, forward and outward extension, substantially as described.

3. A holdback-fastening consisting of a plate formed at one side with a depending post approximately perpendicular thereto, and an arm extending forwardly and obliquely across said plate and terminating in a reverse forwardly and outwardly bent, flattened, tapered extension twisted from an approximately perpendicular toward a horizontal plane in the direction of its free end, substantially as described.

In witness where I hereto affix my signature in presence of two witnesses.

ORIN C. DAVIS.

Witnesses:
HERBERT MANGER,
CHAS. L. GOSS.